Dec. 1, 1970

J. B. ROSSO 3,544,909

GATING CIRCUIT

Original Filed June 7, 1966

INVENTOR.
JOHN B. ROSSO

BY

ATTORNEY

INVENTOR.
JOHN B. ROSSO
ATTORNEY

Dec. 1, 1970  J. B. ROSSO  3,544,909
GATING CIRCUIT
Original Filed June 7, 1966  3 Sheets-Sheet 3

INVENTOR.
JOHN B. ROSSO
BY
ATTORNEY

United States Patent Office 3,544,909
Patented Dec. 1, 1970

3,544,909
GATING CIRCUIT
John B. Rosso, Tulsa, Okla., assignor to Combustion Engineering, Inc., New York, N.Y., a corporation of Delaware
Original application June 7, 1966, Ser. No. 555,765, now Patent No. 3,385,108, dated May 28, 1968. Divided and this application Mar. 11, 1968, Ser. No. 712,257
Int. Cl. H03b 3/02
U.S. Cl. 328—147                          2 Claims

ABSTRACT OF THE DISCLOSURE

An electric circuit including a section for generating a linear sawtooth time base voltage and a second section to compare this sawtooth voltage with an analog D.C. voltage to produce a signal which will control a switch section of the circuit and thereby distribute voltage pulses in accordance with the comparison.

---

This application is a division of my application, SN 555,765, filed June 7, 1966 and issued as patent 3,385,108 on May 28, 1968.

The present invention relates to generating a voltage in response to the flow of a fluid mixture and gating the flow voltage, as pulses, with an analog voltage whose magnitude is proportional to the percentage of a selected fluid in the flowing mixture.

Devices are available, responsive to fluid flow, which generate a large number of electrical voltage pulses for each flowing unit of volume. The turbine meter, with an electrical pick-up, is a good example of a device which can generate voltages at frequencies in the order of thousands of cycles for each barrel of fluid flowing through the meter. Another example of such a device is a positive displacement fluid meter fitted with a high-speed electrical voltage pulse generator. This voltage, often but not necessarily of sinusoidal form, can readily be shaped to a square wave form with a constant amplitude, varying only in frequency as the flow rate changes.

The measurement of dielectric constant is well known. A capacitance form of primary element is made directly responsive to fluids to detect their dielectric constant. The dielectric constants of oil and water differ in value to such an extent that the dielectric constant of a mixture of oil and water is a reliable index of the proportions of oil and water in the mixture. An electronic circuit, including the capacitance, is available to generate a voltage proportional to the capacitance. This voltage is handled as an analog of the percentage of water in the mixture.

A problem, given the high frequency output voltage pulses proportional to flow of a fluid mixture and the analog voltage proportional the percentage of a selected fluid in the flow of the mixture, is the electronic combination of these voltages to establish a manifestation representative of the net selected fluid in the total flow of the mixture.

An object of the present invention is to generate a large number of voltage pulses for each unit of flowing volume of a mixture of fluids and gate the pulses by an analog voltage which is generated proportional to the quantity of a selected one of the fluids of the mixture.

Another object is to generate a large number of voltage pulses for each barrel of an oil-water mixture flowing past a point and generate an analog voltage proportional to the water or oil in the mixture with which to gate the voltage pulses between two counters for separate manifestation of the barrels of oil and barrels of water in any given total barrels of their mixture flowing past the point.

Another object is to generate a voltage of sinusoidal form with a rotative member responsive to the flow of a mixture interrupting magnetic flux, reshape the voltage into a square wave form which varies only in frequency with flow changes, generate a D.C. voltage proportional to the percent of a fluid in the maxture, compare the D.C. voltage with a voltage of fixed time base and amplitude directly proportional to time to establish a gating voltage pulse, and manifest a number of the gated flow pulses as the quantity of the fluid in the mixture.

The present invention contemplates a first primary element located where it will respond to the flow of a fluid mixture by generating electrical voltage pulses which are converted to a square wave form. A second primary element is located where it will respond to the fluid mixture by generating a voltage with a magnitude proportional to the percent of the total volume of the mixture which a selected fluid of the mixture comprises. The voltage generated by the second primary element is compared to a fixed time base signal whose amplitude is directly proportional to time. The voltage pulse resulting from this comparison is utilized to gate the voltage pulses generated by the first primary element to a plurality of outputs for manifestation of the amount of the selected fluid relative to the amount of the mixture. Other objects, advantages and features of this invention will become apparent to one skilled in the art upon consideration of the written specification, appended claims, and attached drawings, wherein:

GENERAL PLAN OF THE DISCLOSURE

Figure 1:
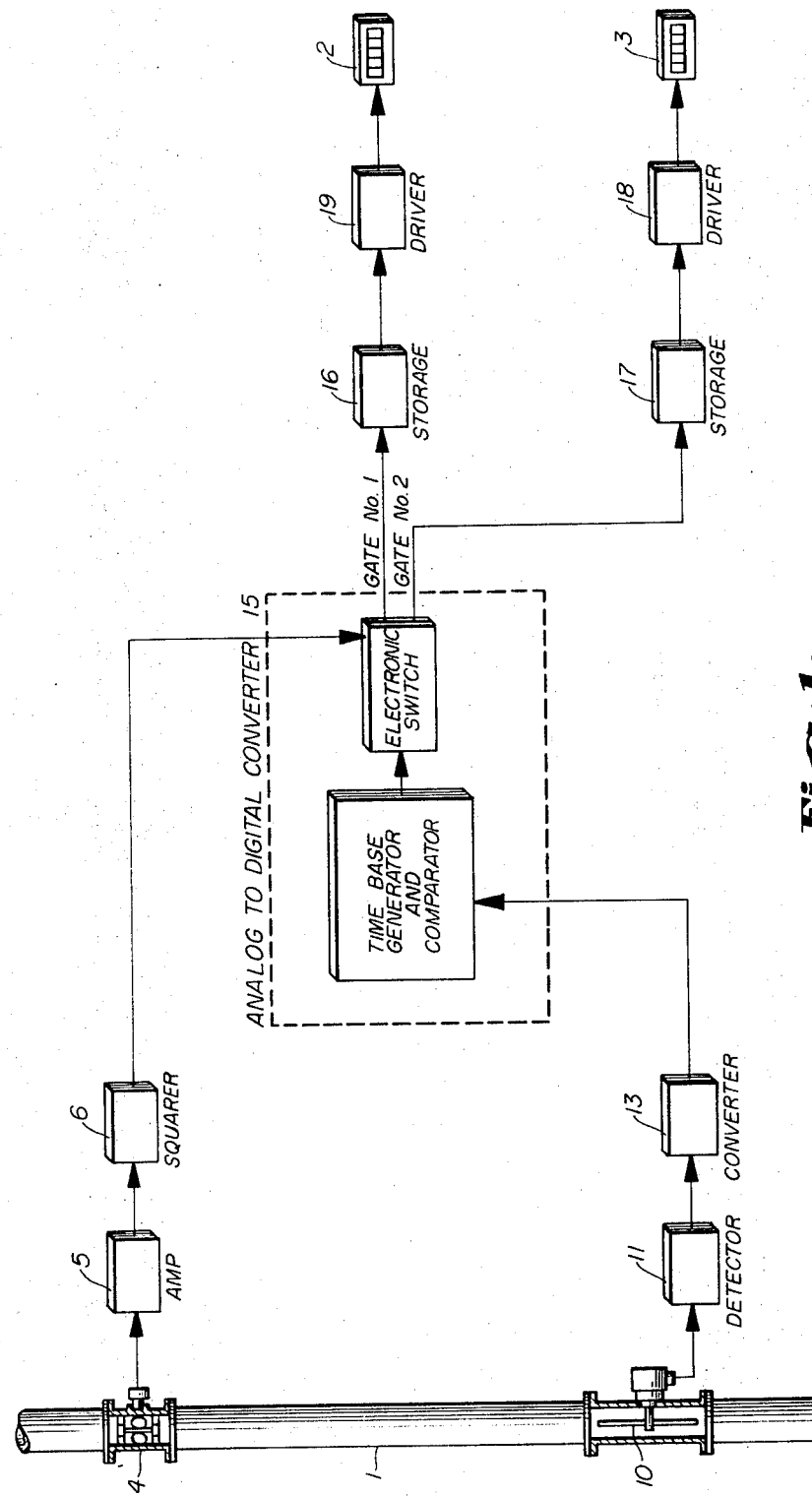
FIG. 1 is a diagrammatic representation of all components of a system in which the present invention is embodied for manifesting the amount of a selected liquid of a mixture.

Reference is made to FIG. 1 in which the technique of using legended blocks is utilized to illustrate features of the invention. A flow of oil well production liquids is flowed in conduit 1. The manifested quantities of oil and water of the liquids on registers 2 and 3 are the end result of the disclosed embodiment of the invention. It is to be understood that the present invention is not limited to measuring oil well production liquids. Any combination of fluids which will properly actuate the primary elements can be measured by the invention. However, the basic mixture of oil well production, as comprising oil and water, will be referred to in this disclosure for simplicity and consistency.

DETECTION OF FLOW

Turbine meter 4 is placed in conduit 1 as a primary element responsive to the flow of the mixture of liquid. The magnetic pick-up of the turbine meter generates a sinusoidal form of voltage with a frequency proportional to the flow rate.

Amplifying network 5 is connected to the turbine meter pick-up to receive the A.C. voltage signal and give it the amplification required by the subsequent circuit elements. The amplified signal is next fed to a circuit indicated at 6. Unit 6 has a circuit which shapes the amplified A.C. voltage signal to a square wave form of constant amplitude. The frequency of this signal remains variable with flow rate. These pulses, initially generated by the meter 4, are to be diverted to digital counters 2 and 3 as a desired function of the invention.

DETECTION OF SELECTED FLUID

A capacitor 10 is also placed in conduit 1 as a primary element. Capacitor 10 is mounted so the mixture of fluids passes between the plates of capacitor 10. In this way, a detection of the dielectric constant of the mixture is continuously measured at the same time the flow rate of the mixture is measured by meter 4.

As the water content of the mixture changes, the capacitance of probe 10 changes. The probe 10 is connected to detector 11 which includes the probe 10 in its circuit and produces an electrical signal. The probe signal is fed into converter 13 which is specifically designed to produce a D.C. voltage over a specific range with a 0–100% change in water content of the mixture passing through conduit 1. This D.C. voltage is applied to the diversion of the voltage pulses from squarer 6 to the counters 2 and 3. This signal is an analog of the percentage of water in the mixture of liquids and, together with the output of squarer 6, is fed to the converter network 15 for the control of the flow pulses by the analog voltage.

ANALOG TO DIGITAL CONVERTER

It has been described how the circuit 15 receives two inputs. The first input is the square wave voltage pulses from the turbine meter. The second input is the D.C. voltage generated by probe 10.

Within converter 15, a circuit is arranged to generate a fixed time base voltage whose amplitude is directly proportional to time. This form of voltage variation is commonly referred to as a linear sawtooth.

The D.C. voltage from converter 13 is compared to the time base voltage. When the two voltages are equal, a gating circuit is operated to divert the voltage pulses from the turbine to one of two outputs.

In general, the relative amounts of the voltage pulses diverted to each of the two outputs is dependent only on the analog signal. For 30% water content of the mixture, 30% of the voltage pulses during a fixed time period are diverted to the output from which the water register is driven. The voltage pulses representative of oil are diverted to the other output for the remaining 70% of the fixed time base.

The comparison function and gating function are carried out with solid state electronic components. The outputs from the gating circuits are disclosed here as connected to storage circuits 16 and 17; the storage circuits are connected to driver circuits 18 and 19; and the driver circuits are shown as controlling the registers 2 and 3. However, it is again emphasized that the outputs from analog to digital converter 15 could feed any number of complex computer circuits designed to receive and utilize this form of the information concerning the composition of the mixture flowing in conduit 1. Registers 2 and 3 are only examples of a simple form of structure to give manifestation to the measurement.

CIRCUIT OF ANALOG TO DIGITAL CONVERTER 15

The general function of converter 15 has been disclosed, with two inputs feeding signals to the circuit and two outputs receiving the gated signals. Broadly, one input is a voltage to be gated, specifically disclosed here as voltage pulses proportional to flow passing through turbine meter 4. The second input is a control D.C. voltage, specifically disclosed here as from probe 10, representative of the magnitude of a selected fluid of the mixture flowing through the turbine meter.

The two outputs are the voltage pulse input, gated under the control of the D.C. input voltage. The gating time base is fixed and the ratio of one gated output to the other varies in direct proportion to the D.C. control voltage. In the specific embodiment disclosed, there is 100% output on gate No. 2 and zero output on gate No. 1 with minimum D.C. control voltage. The opposite occurs with maximum D.C. control voltage. The ratio of gate No. 1 output to gate No. 2 output varies as a linear function of the D.C. control voltage between these two extremes.

Figure 2:
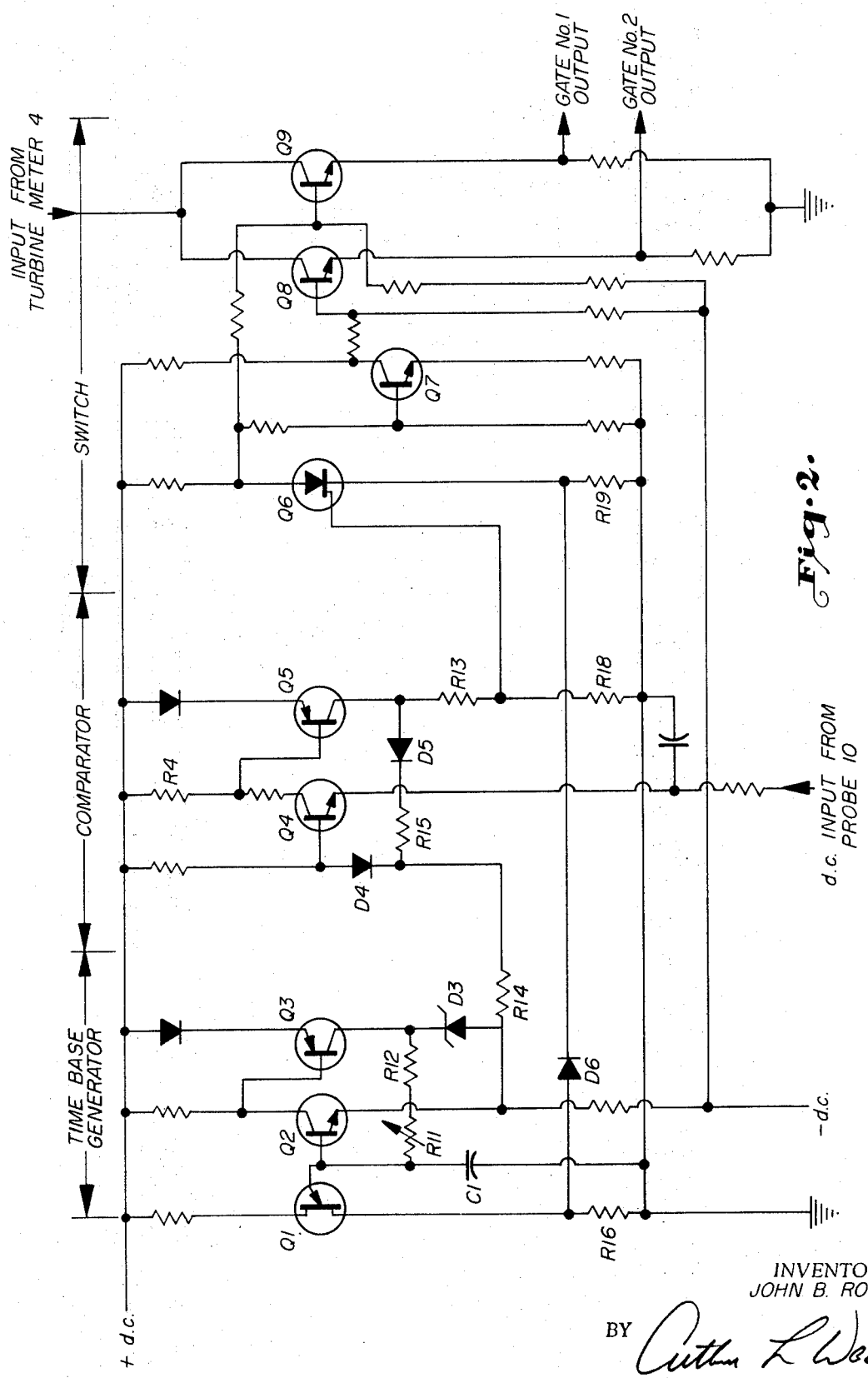
FIG. 2 is a schematic circuit diagram of the analog to digital converter of FIG. 1.

Becoming more specific, FIG. 2 is established to disclose further detail of the circuit of converter 15. The inputs from the probe capacitor and turbine meter pickup are legended for orientation with FIG. 1. Also, the gate outputs to the registers are legended. The basic function of the circuit has one center about transistor Q4, where a generated linear sawtooth form of voltage is compared to the D.C. control voltage to produce a voltage pulse which is constant in magnitude and has a time duration proportional to the percentage of the selected fluid in the mixture flowing through the turbine meter. This time duration pulse is employed to gate the voltage pulses proportional to flow to the two outputs.

In FIG. 2, the circuit of the time base generator centers about transistors Q1, Q2 and Q3. Q1 is used as a resistance capacitance unijunction oscillator. With a Zener diode D3, Q2 and Q3 are connected to form a constant current charging network for timing capacitor C1.

Diode D3 has a negative D.C. voltage applied to it. Diode D3 maintains a constant voltage across charging resistors R11 and R12. The result is generation of a linear charging current for timing capacitor C1.

Figure 3:
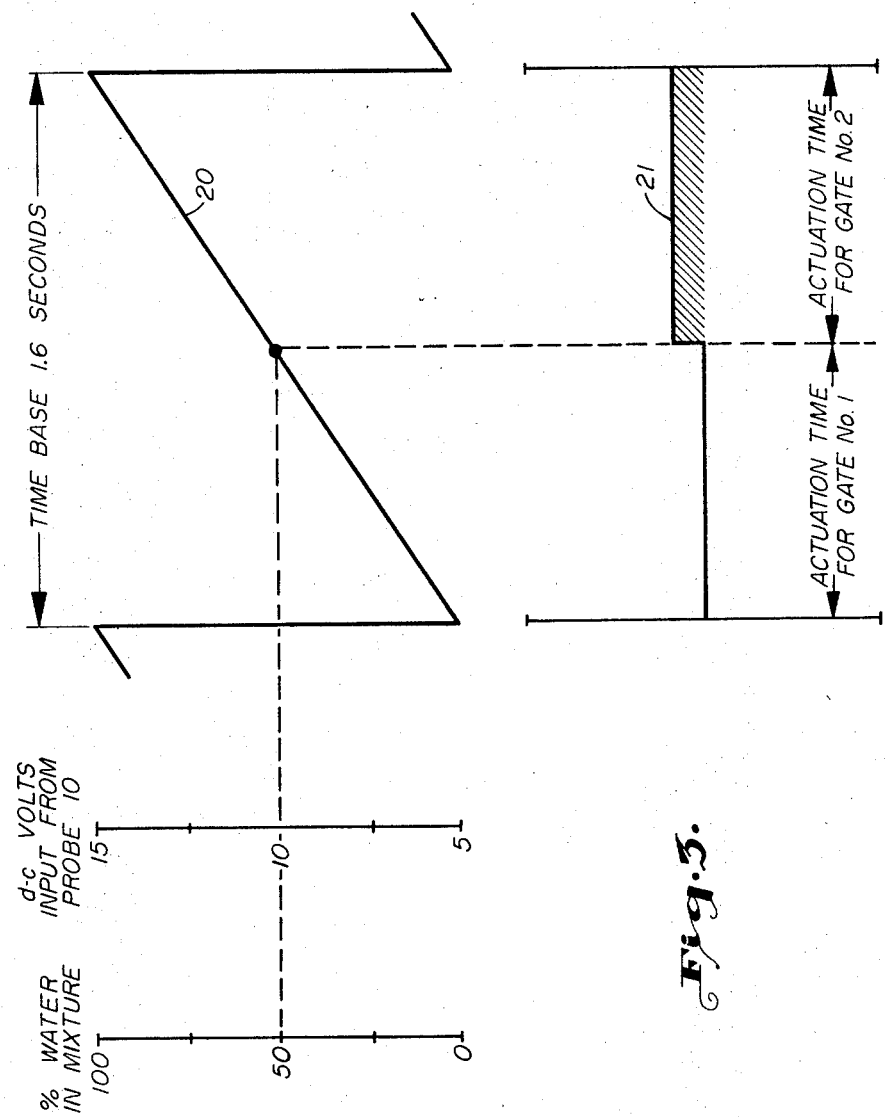
FIG. 3 is a graphical representation of the voltage generated by the time base generator of FIG. 2 with legended correlation to the constant amplitude voltage produced by the comparison.

The linear charging current and voltage is shown graphically in FIG. 3. The rise of voltage over a predetermined range is depicted with line 20. Note the circuit is designed to establish this rise in voltage over a predetermined time interval.

The amplified linear charging voltage across capacitor C1, the output of the time base operator, is coupled to the base of transistor Q4 through resistor R14 and diode D4. When this voltage on the base of Q4 rises above the voltage of the emitter, the transistor Q4 will conduct and develop a voltage across R4. This voltage across R4 is applied to the base of transistor Q5 to develop an amplified voltage across resistors R13 and R18.

The voltage pulse generated by this comparison between the sawtooth voltage applied to the base of Q4 and the control voltage applied to the emitter of Q4 appears across R4. This pulse has a duration for that remaining time the sawtooth pulse is generated after it has equaled the control voltage on the emitter and caused Q4 to conduct. This comparison pulse is of constant magnitude but with a time duration proportional to the magnitude of the control voltage within its predetermined range. More specifically, the pulse has a duration proportional to the control voltage magnitude. In any event, the pulse is proportional to the variable generating the D.C. control voltage and is used to gate the voltage pulses to read-out the relative amount of the variable quantity of the selected fluid in the mixture of fluids detected by the system.

FEED-BACK FOR SHAPING THE TIME DURATION PULSE

The voltage pulse appearing across R4 is the basic force utilized for control of the gating action and its development should provide a sharp rise and fall to function properly in the circuit of the switch to which it is fed. A feed-back circuit is provided to take the amplified version of the pulse which appears across R13 and R18 and apply it to the base circuit of Q4.

Specifically, the voltage rise across resistors R13 and R18 is coupled through diode D5 and resistor R15 and D4 to the base circuit of transistor Q4. This regenerative feed-back network decreases the turn-in time of Q4 and thereby squares the shape of the time duration voltage pulse.

Properly shaped, the voltage pulse across R13 is the product of the time base generator and comparator. This pulse is ready to be utilized in control of the switch to distribute the voltage pulses applied to the multiple gates of the switch.

GATING SWITCH

The gating switch essentially comprises a pair of transistors, properly controlled by the time duration pulse across R18. Transistors Q8 and Q9 are disclosed as these devices, with the voltage pulses to be gated applied in parallel to their collectors. When one of the pair of transistors is turned on, i.e., made conductive, the voltage on its collector appears across the resistance connected to its emitter. If the transistors are alternately turned on, the voltage applied to their collectors in parallel alternately appears across their emitter resistors.

A silicon controlled rectifier Q6 has its control gate connected between R13 and R18 to receive the voltage rise across R18 which will fire Q6. When Q6 fires, its anode voltage drops and turns off Q7 and Q9 while turning on Q8. Q8 passes the voltage to gate No. 2 output. At the end of the time duration pulse, before the compared voltages on Q4 are again equal, the anode voltage of Q6 is at its maximum, keeping Q9 on and Q8 off. Therefore, a complete cycle of gating is carried out in the predetermined time span set as the time base for the sawtooth wave generated by Q1, Q2 and Q3. No voltage appears across the emitter resistance of Q8, R13 and R18 until the time duration pulse is generated by the comparison on Q4. The length of this pulse, within the fixed time span, is established by the magnitude of the D.C. control voltage input from the probe 10. Therefore, the gating by Q8 and Q9 is divided within the sawtooth span by the alternate conduction and non-conduction periods of the transistors within the span.

TURN-OFF OF Q6

At the end of the timing cycle, transistor Q1 fires and discharges timing capacitor C1. The discharge of C1 causes a positive pulse to be developed across resistor R16. This pulse is coupled by diode D6 to the cathode resistor R19 of Q6. This pulse is larger than the anode supply of Q6 and turns off Q6. C1 then starts to recharge and repeat the timing cycle.

Referring again to FIG. 3, the sawtooth voltage generated is depicted with line 20 as increasing over a time interval of 1.6 seconds from 5 to 15 volts. The input voltage from probe 10 is indicated by graph over a scale from 5 to 15 volts D.C. Assuming the input is 10 volts, this input and the sawtooth voltage will equal each other half way through the 1.6 second generation of the sawtooth voltage.

The time duration voltage pulse appearing across R18 is represented by line 21 in FIG. 3. This voltage pulse is a square wave in form and exists for that portion of the time base of 1.6 seconds which remains after the sawtooth and input from probe 10 have reached equality. In FIG. 3 this line 21 voltage pulse is shown as lasting for half the time base period.

The effect of the time duration voltage pulse on the electronic switch has already been described. With the line 21 voltage pulse, one half of the switch gates the voltage pulses from turbine meter 4 for half the 1.6 second time base while the other half of the switch gates the voltage pulses during the other half of the 1.6 seconds. This distribution of the turbine meter signals between gate No. 1 and gate No. 2 is represented by the length of voltage pulse 21 within the 1.6 second time base.

As an additional graphical aid, the actuation time for each gate, relative to the voltage pulse 21, is indicated in FIG. 3.

Returning to FIG. 1, the gated pulses are depicted as fed through the gates to storage circuits 16 and 17. The storage circuits receive a predetermined number of turbine meter pulses and then produce an output pulse to a driver circuit. The drivers actuate the registers to give a manifestation of the number of barrels of selected, and remaining, fluid flowing through turbine meter 4.

The number of pulses stored is predetermined. For example, if the turbine meter produced 9,867 voltage pulses per barrel and the storage mechanism was set for 9,867, it would produce one output pulse for every 9,867 input pulses. The register would read directly in barrels. By presetting the storage unit to numbers other than 9,867, the counter can be made to read out in gallons, tenths of barrels, etc.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A circuit for gating voltage pulses, including,
   a first primary element connected to the circuit and continuously generating voltage pulses,
   a second primary element connected to the circuit and generating a D.C. voltage,
   a generator connected to the circuit and producing a voltage which periodically varies between a selected minimum value and a selected maximum value in a linear function within a selected time period,
   a comparative circuit connected to the circuit between the second primary element and generator and producing separate outputs of different voltage levels over the separate portions of the selected time period during which portions the primary element and generator voltages being compared are unequal,
   and a switch structure connected to the comparative circuit outputs of different voltage levels and the first primary element and controlled by the comparative circuit outputs to distribute the voltage pulses of the first primary element between a plurality of receiving circuits for manifestation.

2. The circuit of claim 1 in which the comparative circuit is arranged to provide its output voltage with constant amplitude and a square form.

References Cited

UNITED STATES PATENTS

| | | | |
|---|---|---|---|
| 2,909,676 | 10/1959 | Thomas | 307—228 X |
| 3,056,047 | 9/1962 | Cooke-Yarborough | 307—228 X |
| 3,154,738 | 10/1964 | Greene et al. | 328—147 X |
| 3,458,721 | 7/1969 | Maynard | 328—150 X |

STANLEY T. KRAWCZEWICZ, Primary Examiner

U.S. Cl. X.R.

307—228, 235, 241, 265; 328—185